No. 850,956. PATENTED APR. 23, 1907.
G. L. McQUIGG.
PNEUMATIC TIRE.
APPLICATION FILED OCT. 11, 1906.
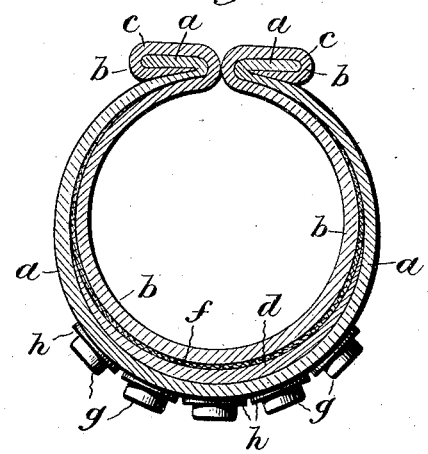
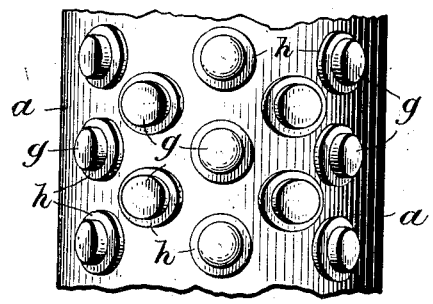
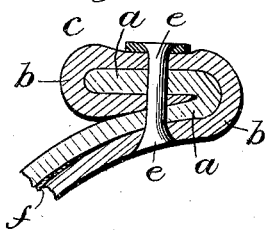
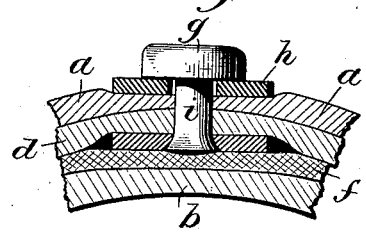
Witnesses:
Jas. E. Hutchinson
Edward N. Sarton
Inventor:
George L. McQuigg
By Hall & Heylmun atty's

UNITED STATES PATENT OFFICE.

GEORGE L. McQUIGG, OF FLINT, MICHIGAN.

PNEUMATIC TIRE.

No. 850,956.  Specification of Letters Patent.  Patented April 23, 1907.

Application filed October 11, 1906. Serial No. 338,436.

*To all whom it may concern:*

Be it known that I, GEORGE L. MCQUIGG, a citizen of the United States, residing in the city of Flint, State of Michigan, have invented certain new and useful Improvements in Pneumatic Tires, of which the following is a specification.

My invention relates to pneumatic tires, and more particularly to shoes or casings forming a part of the type of pneumatic tires known as "double-tube," which are now quite generally employed on automobiles or motor-cars.

The object of the invention is to provide a tire which is particularly simple in construction and highly efficient in use.

The invention includes the combination and arrangement of parts to be hereinafter described, and pointed out in the claims.

A preferred exemplification of the invention is shown in the accompanying drawings, in which—

Figure 1 is a transverse sectional view of the tire-casing; Fig. 2, a plan view of the tread portion thereof; Fig. 3, a detail of one of the clencher-beads, and Fig. 4 a detail view of one of the armor-rivets and associated parts.

The invention includes generally a shoe or casing constructed of two or more layers or strips of stretched rawhide or leather having their longitudinal edge marginal portions doubled over to provide integral clencher-beads, the strips or layers being secured to each other by the securing means utilized for holding the clencher-beads in shape.

The invention further includes a novel construction or armor embodied in the tread portion of the casing itself, and it further includes a non-heat-conducting medium constituting a part of the casing for preventing the transmission of heat generated at the tread of the tire from being transmitted to the air-tire housed in the casing.

In the particular exemplification of my invention illustrated in the accompanying drawings the outer layer or strip of the casing is designated *a* and the inner layer or strip *b*, the corresponding side portions of the two strips being brought together and doubled over to form the clencher-beads *c*. An additional strip of rawhide is preferably located between the two layers *a b* at the tread position for the purpose of reinforcing the same, this strip or insert being designated *d*.

As before premised, the clencher-beads *c* are formed integral with the body of the casing by bending over and suitably securing together the longitudinal marginal portions of the inner and outer layers *a b*. As illustrated herein, the said marginal portions of the layers are bent outwardly and the marginal parts of the inner layer *b* extended around the edge of the layer *a* and inserted or tucked between the latter and the periphery of the casing formed by the main part of the layer *a*. Suitable fastening-rivets (designated *e*) are employed for retaining the beads in shape, these rivets preferably extending through the doubled-over portions of the layers *a b*, which form the beads, and through the main portions of the layers *a b* contiguous to the beads, so that these beads are securely held down in position, and the two layers *a b* are securely fastened together. In the construction of the tire illustrated the heads of the beads are located on the inner periphery of the casing and are pressed down flush therewith, and the ends of the shanks of the rivet are headed over on the outer surface of the beads upon suitable washers, which rest upon these outer surfaces.

The non-heat-conducting medium for protecting the inner tube is preferably located between the insert *d* and the inner layer *b*. In the present embodiment of the invention this medium (designated *f*) is shown as a strip of asbestos, which is cemented to the outer surface of the inner layer *b*.

As hereinbefore indicated, my improved casing embodies a novel construction of armor-tread constituting a substantially integral part of the casing itself. This tread is provided by a series of rivets *g*, having large heads providing the tread-surfaces. These rivets, with associated washers, are of novel construction, as they provide for a slight movement of the individual rivets upon contact with an obstruction with a minimum liability of loosening the rivet in the casing. As herein illustrated, each rivet is provided with a large head projecting from the periphery of the casing, which rests upon a washer *h*, located beneath the head and between the latter and the periphery of the layer *a*, this washer fitting the shank *i* of the rivet loosely.

The shank of the rivet extends through the layer *a* and through the insert *d* and is headed up upon a washer which fits the shank tightly and rests upon the inner face of the insert. The rivets $g$ tightly compress the layer $a$ and insert $d$ together and are held in position in a substantially rigid manner; but the loose fit of the washer $h$ to the shank of the rivet permits of the latter having some slight lateral movement when the head strikes an obstruction without loosening the rivet in the casing.

The construction and operation of my invention will be understood from the foregoing description, taken in connection with the accompanying drawings, and it will be appreciated that other embodiments of the invention may be made in addition to the particular exemplification illustrated and described without departing from the spirit and scope thereof.

I claim—

1. As a new article of manufacture, a tire-casing including an inner and an outer layer, said layers being doubled over at their side margins to provide clencher-beads and rivets for securing said beads, substantially as described.

2. As a new article of manufacture, a tire-casing including an inner and an outer layer, the marginal portions of both layers extending outwardly and the marginal portion of said inner layer extending around the edges of the marginal portion of the outer layer and being tucked in between the latter marginal portion and periphery of the casing and rivets extending through the several thicknesses for securing the parts, substantially as described.

3. As a new article of manufacture, a tire-casing including two strips or layers of stretched rawhide, an insert of rawhide between said layers and an armor for the tread of the casing comprising a plurality of rivets having heads projecting from the periphery of the casing and two washers associated with each rivet, one of said washers resting upon the insert and fitting the shank of the rivet tightly, the end of the shank being headed up thereupon and the other washer fitting the shank of the rivet loosely and being interposed between the head of the rivet and the periphery of the outer layer, substantially as described.

In testimony whereof I have hereunto signed my name, in the presence of two attesting witnesses, at Flint, Michigan, this 8th day of October, 1906.

GEORGE L. McQUIGG.

Witnesses:
FRANK DULLAM,
A. P. DULLAM.